(12) United States Patent
Moore

(10) Patent No.: US 8,021,216 B1
(45) Date of Patent: Sep. 20, 2011

(54) FIELD DRESSING KNIFE

(76) Inventor: Harold J. Moore, Waverly, IA (US)

( * ) Notice: Subject to any disclaimer, the term of this patent is extended or adjusted under 35 U.S.C. 154(b) by 2 days.

(21) Appl. No.: 12/478,395

(22) Filed: Jun. 4, 2009

Related U.S. Application Data

(62) Division of application No. 11/235,886, filed on Sep. 27, 2005, now Pat. No. 7,578,731.

(51) Int. Cl.
*A22C 21/02* (2006.01)
(52) U.S. Cl. .................................................... 452/103
(58) Field of Classification Search ............... 452/6, 12, 452/13, 16, 17, 102–106
See application file for complete search history.

(56) References Cited

U.S. PATENT DOCUMENTS

| | | | | |
|---|---|---|---|---|
| 790,760 | A | * | 5/1905 | Stuart ............................ 172/376 |
| 2,630,314 | A | * | 3/1953 | Cadwallader ................. 177/129 |
| 3,991,466 | A | * | 11/1976 | Smith .............................. 30/149 |
| 4,258,452 | A | | 3/1981 | Adcock |
| 4,290,201 | A | | 9/1981 | Goodwin |
| 4,477,943 | A | | 10/1984 | Grush |
| 4,707,920 | A | | 11/1987 | Montgomery |
| 4,759,126 | A | | 7/1988 | McCoy |
| 4,787,109 | A | | 11/1988 | Bennett |
| 5,033,987 | A | | 7/1991 | Bloch |
| 6,578,271 | B1 | | 6/2003 | Macek |
| 6,607,430 | B1 | * | 8/2003 | Navarette ...................... 452/105 |
| 7,198,562 | B2 | | 4/2007 | Whetstone |
| 7,487,565 | B1 | * | 2/2009 | Sundling et al. .................. 7/158 |

OTHER PUBLICATIONS 1 sheet, from website for Cabela's Inc.—showing Survival Knives.
1 sheet, from website for Cabela's Inc.—showing a Non-serrated knife and a Serrated knife—both leather handled.
1 sheet, from website for Cabela's Inc.—showing a Serrated knife and a Non-serrated knife—both black handled.

* cited by examiner

*Primary Examiner* — Thomas Price
(74) *Attorney, Agent, or Firm* — Sturm & Fix LLP

(57) ABSTRACT

A field dressing knife suitable for all aspects of field dressing small and large game is disclosed. Various novel aspects of the knife include: a large butt-end of the handle and a groove near the butt-end of the handle, both to spread the normal stress over a larger surface area when striking the butt-end of the handle with a free hand for splitting pelvis and brisket bones; and a configurable handle, permitting the double-edged field dressing knife to be used in knife mode or in a hatchet mode.

14 Claims, 18 Drawing Sheets

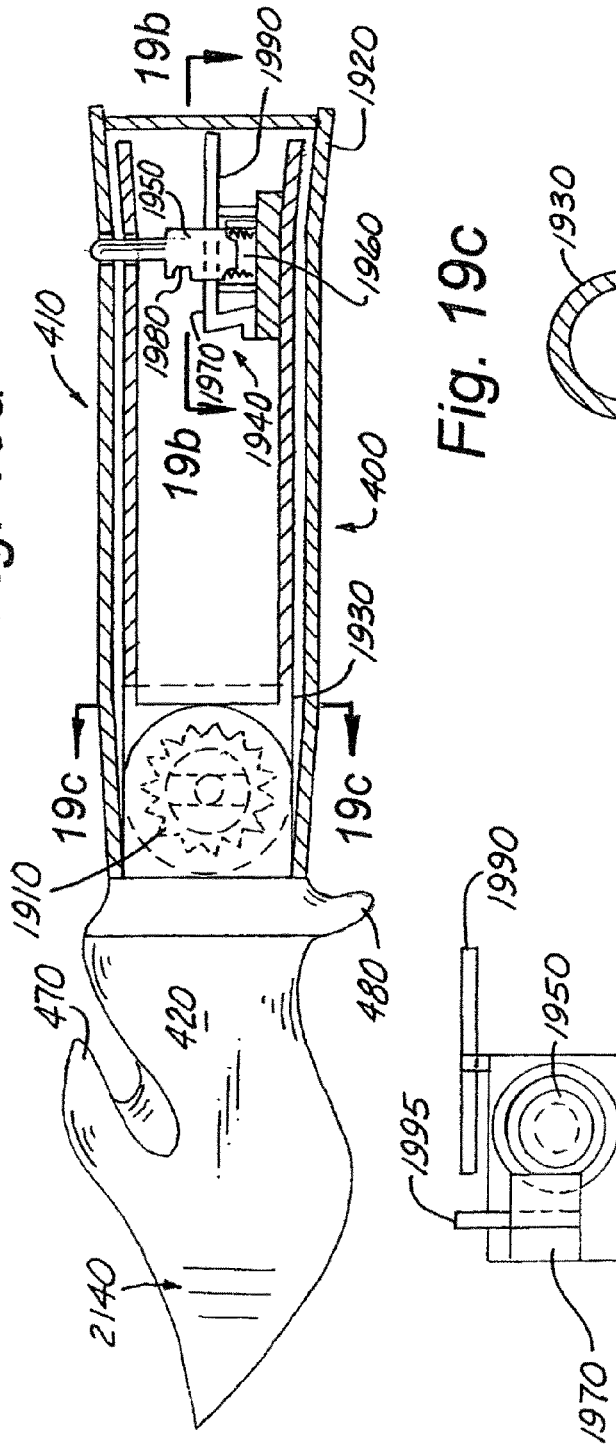
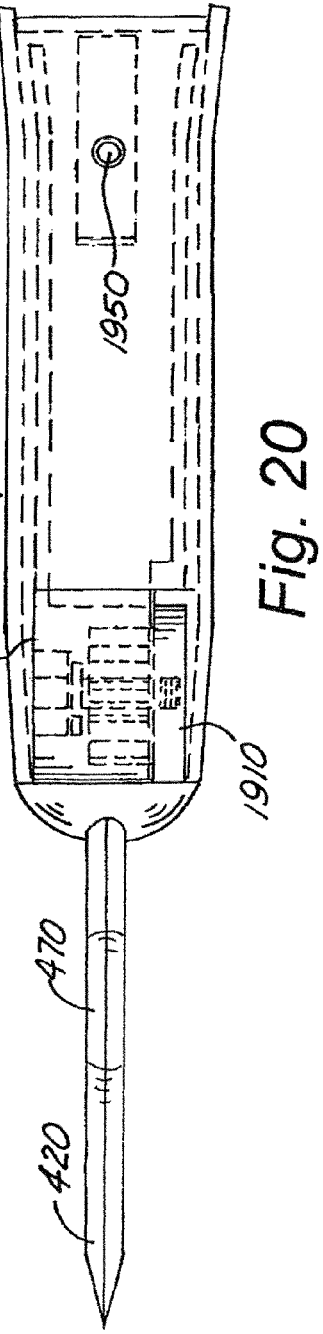
Fig. 19a
Fig. 19b
Fig. 19c
Fig. 20

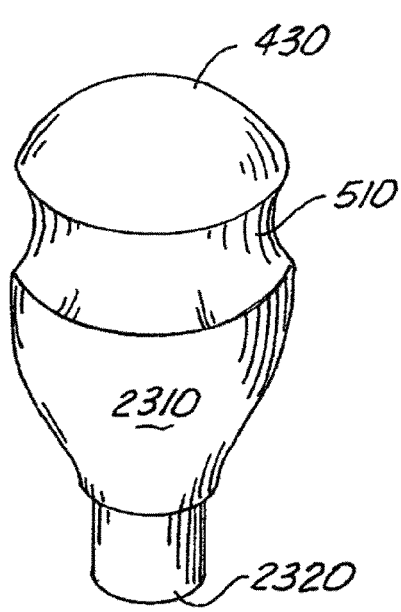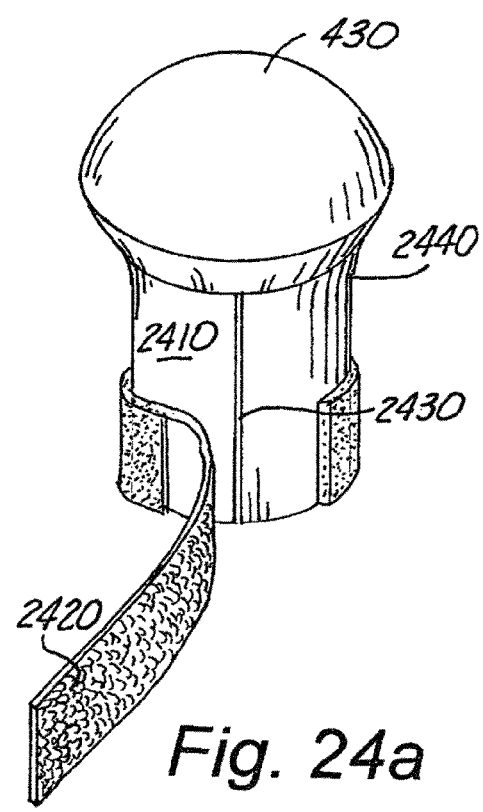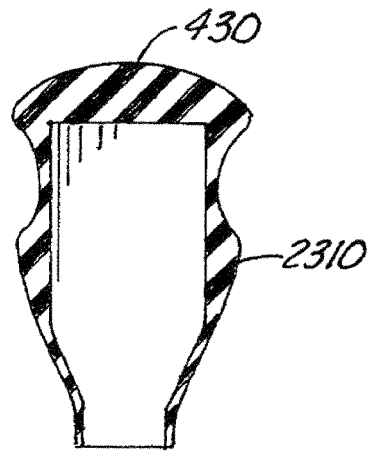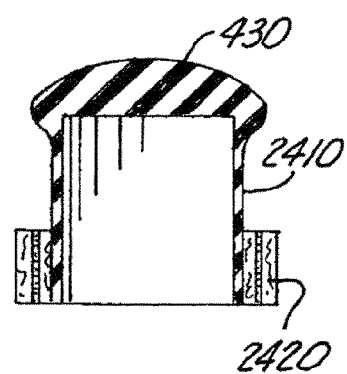
Fig. 23a
Fig. 24a
Fig. 23b
Fig. 24b

Fig. 27
Fig. 28
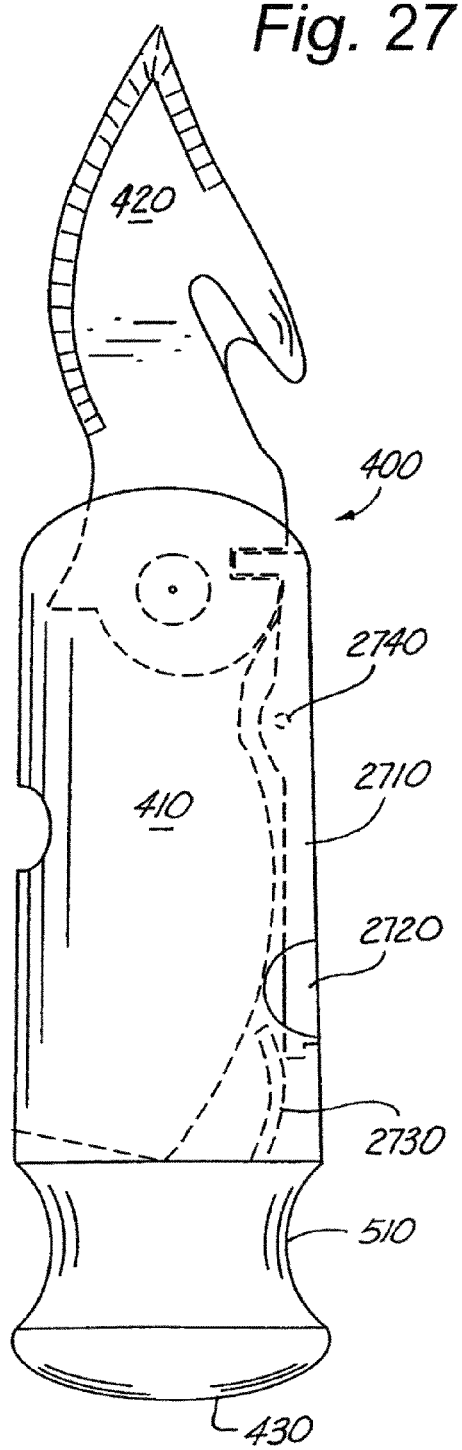
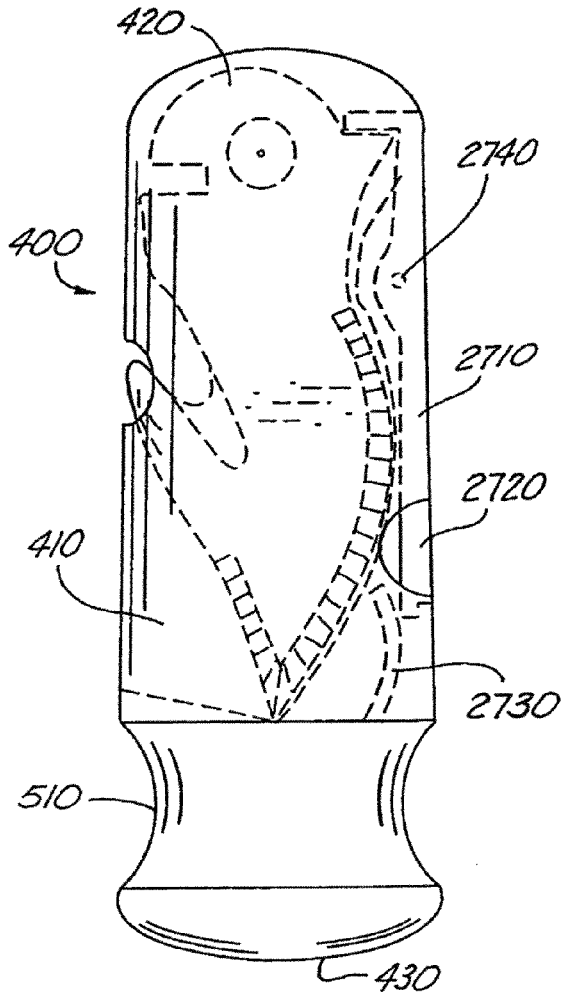

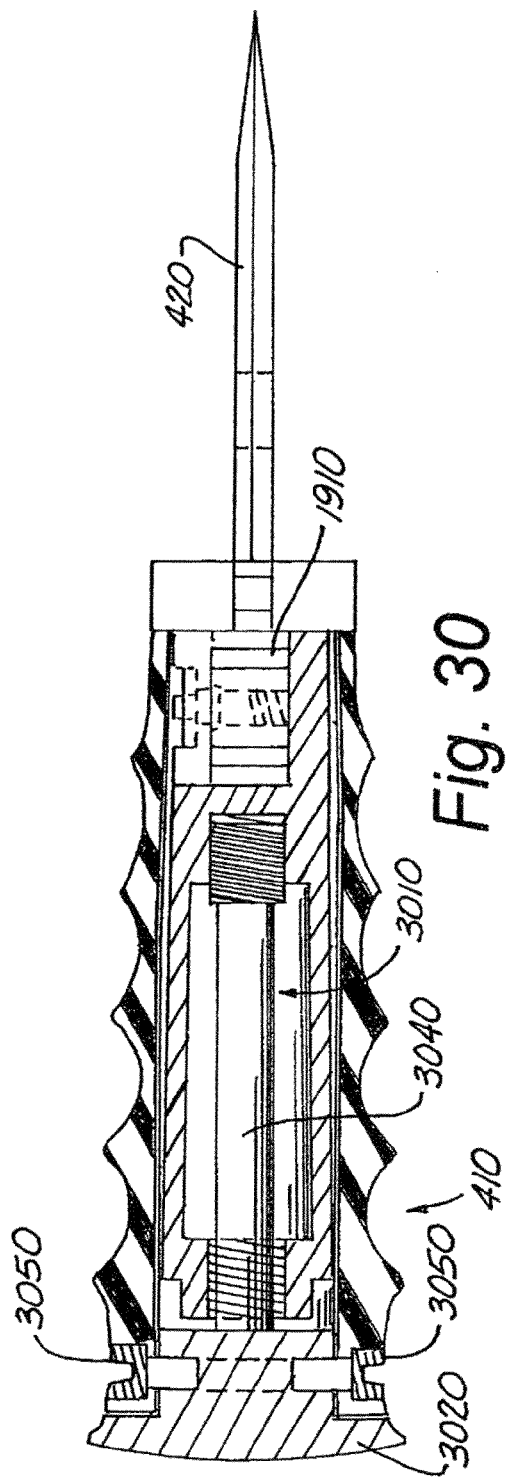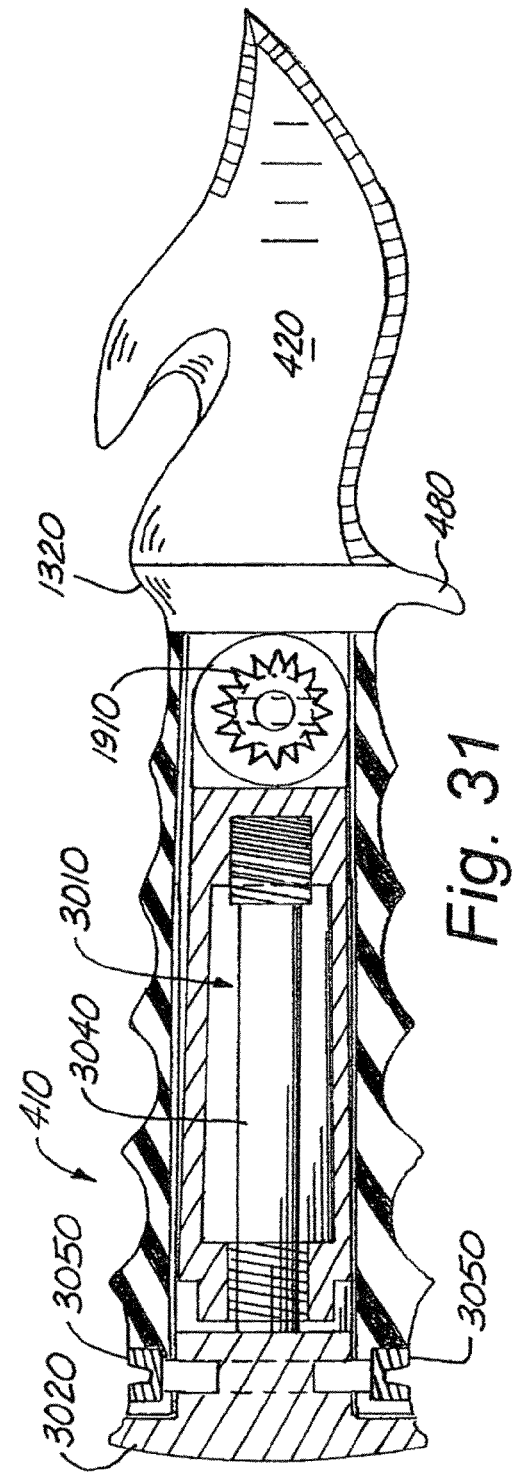

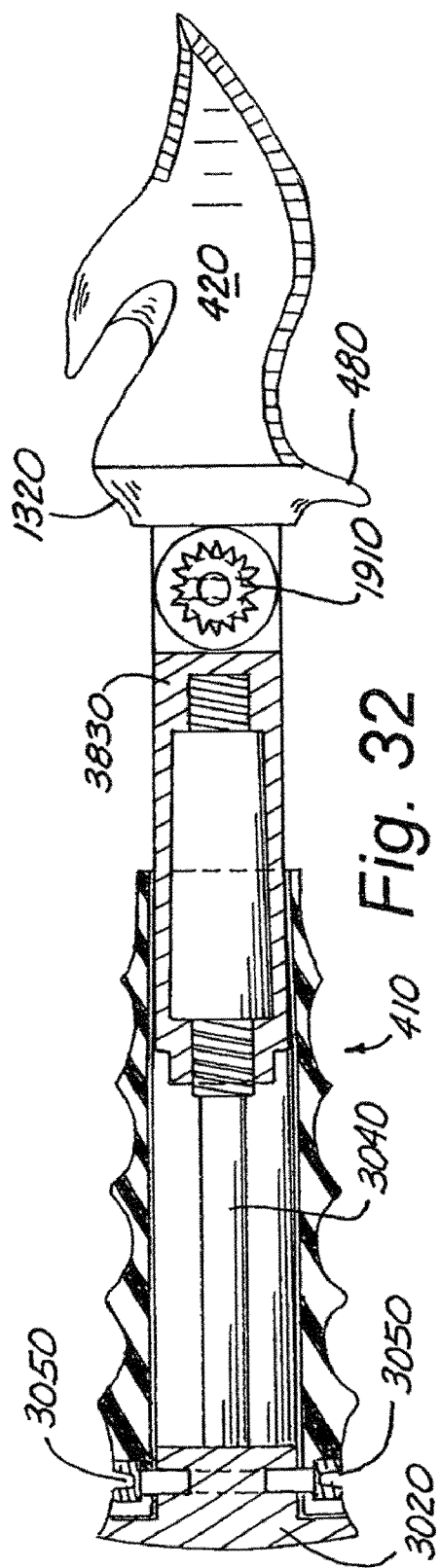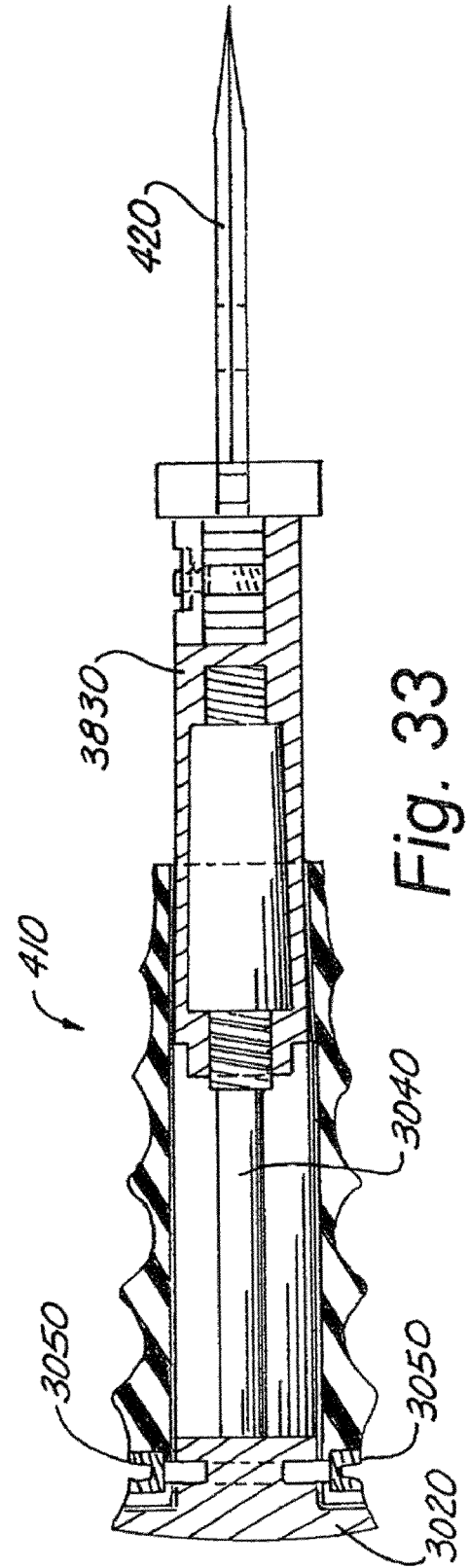

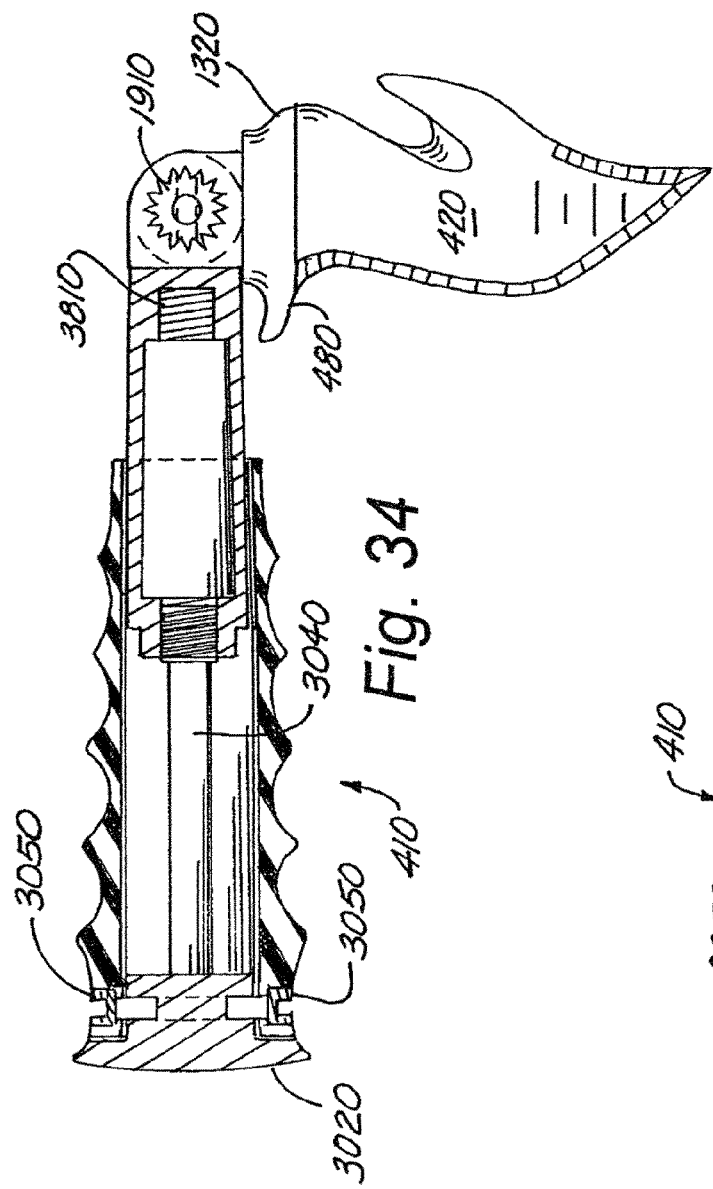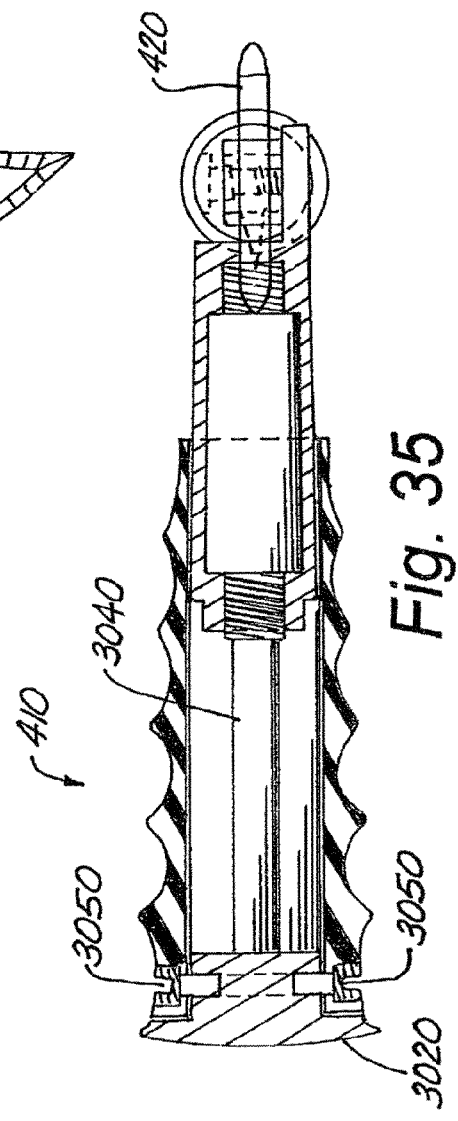

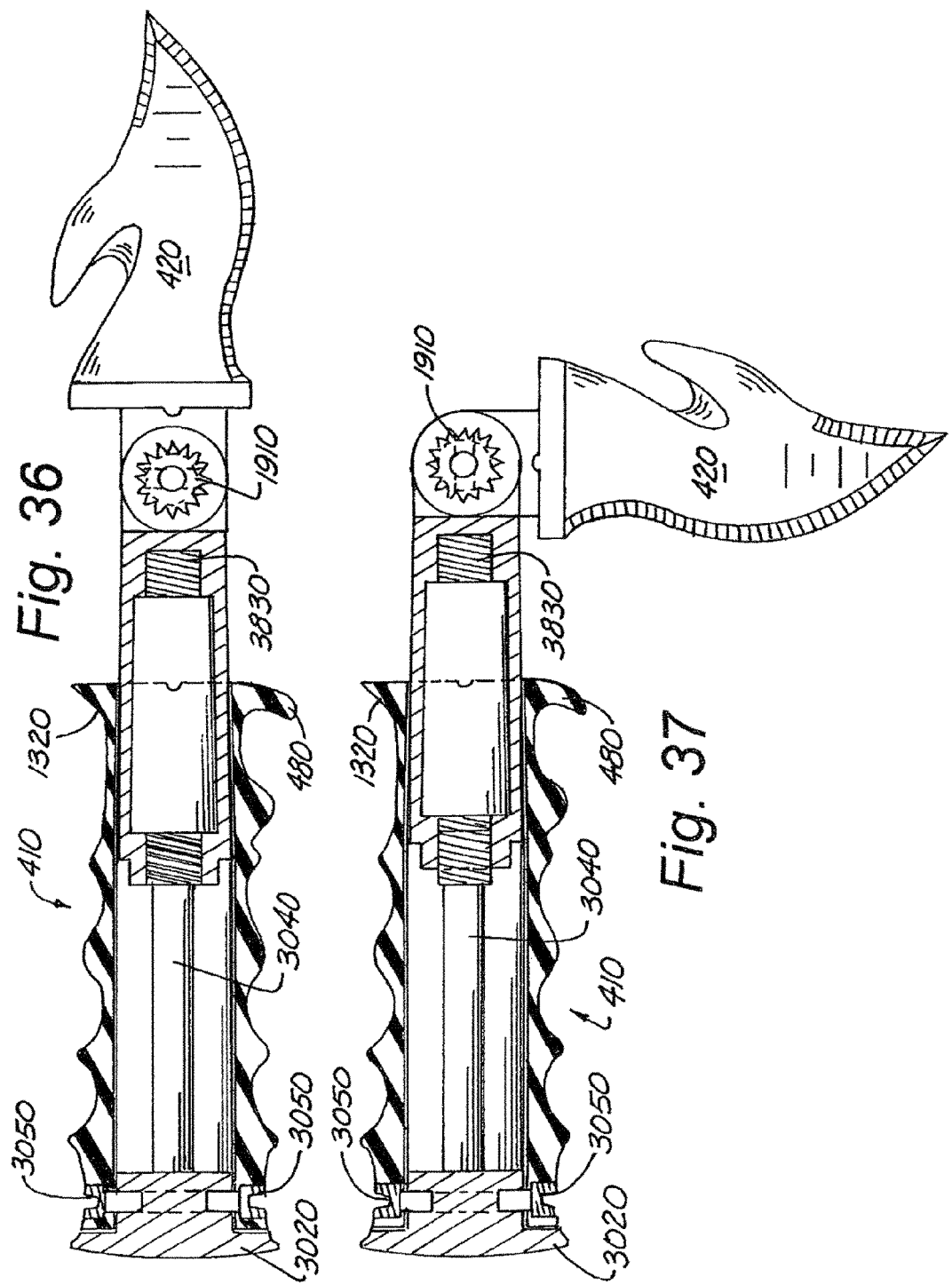

FIELD DRESSING KNIFE

CROSS REFERENCE TO RELATED APPLICATIONS

This application is a divisional of U.S. patent application Ser. No. 11/235,886 filed Sep. 27, 2005, entitled FIELD DRESSING KNIFE, and is incorporated herein by reference in its entirety.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates generally to a knife. More specifically, the present invention relates to a field dressing knife for complete field dressing of small and large game and having special application to the severing of the pelvis and brisket bones of small and large game.

2. Background Art

Soon after a game animal is killed, field dressing is required to inhibit the growth of bacteria, thereby preventing premature spoilage of meat. Field dressing refers to the process of preparing the carcass of a game animal, often at the approximate location the animal was killed, to minimize spoilage and preserve the meat for later consumption. Once all life functions have ceased, the carcass begins to decay. Unchecked bacterial growth of the internal organs (viscera) and body fluids spreads quickly through the carcass causing the meat to be unfit for human consumption in a matter of hours, depending on the ambient temperature. To prevent this, the process of gutting, or evisceration, is performed. Gutting involves removing all viscera inside the abdomen and thorax. Removing viscera prevents bacterial growth in the viscera from spreading to the meat, aids in cooling the meat, and prevents unpleasant visceral body fluids from spreading to the meat. Heat and moisture further increase the spread of bacteria. The process of gutting necessarily includes severing the brisket and pelvis bones of the game animal carcass in order to remove all the viscera contained under these bones and to open these areas up for better air drying and cooling.

Several devices have been used over the years by hunters for field dressing large game, especially for severing of the pelvis and brisket bones. One such tool is a handsaw 100 as illustrated in FIGS. 1 and 2. Handsaws 100 tend to be large and awkward to carry in the field while hunting. They work better on the brisket, where a full pass of the saw blade is possible, than on the pelvis bone. For splitting the pelvis bone, it is natural to attempt to saw from one end to the other as shown in FIG. 1. However, a full pass of the saw blade cannot be made because the area between the pelvis bone and the spine is insufficiently deep. This region also contains both the urethra 110 and colon 120. Sawing the pelvis with vertical strokes, while the carcass is on its back, results in puncturing these waste tubes and contamination of the meat.

Placing the handsaw blade across the exposed pelvis bone, parallel to the spine as shown in FIG. 2 is more difficult. In this position, the saw teeth engage a minimum of six inches of bone in a large animal such as an elk. Additionally, sawing from the back end of the elk places the tip of the handsaw 100 directly in line with both the colon 120 and the urine bladder 210. There is, again, danger of meat contamination.

Saw blades used for field dressing large game tend to be difficult to clean. As well, bone rapidly dulls the saw 100 which is difficult to sharpen, especially in the field. For complete field dressing of large game, when using a handsaw 100 for severing the pelvis and brisket bones, both the handsaw 100 and a knife must be carried while hunting.

Another tool used for splitting the pelvis and brisket bones of large game is a hatchet. A hatchet is heavy for hunters to carry all day. The most convenient way to carry a hatchet is to secure it in a scabbard attached to a belt. The hatchet handle, dangling down below the waist, tends to interfere with tall grass, brush, and trees as the hunter moves through the field or woods. Like the handsaw 100, a hatchet works better on the brisket bone than on the pelvis bone. Caution must be taken when chopping through the pelvis bone because of the proximity of the urethra 110, bladder 210, and colon 120, as mentioned in conjunction with the handsaw 100. Unpleasant results due to using a hatchet for splitting the brisket include jagged and sharp bone splinters left protruding from the split brisket. During the removal of the windpipe and lungs, the hunter's arm, with a knife in hand, must pass through the chopped brisket opening in order to cut tendons. As with the handsaw 100, two tools—a hatchet and a knife—must be carried while hunting in order to fully field dress game including splitting the pelvis and brisket using the hatchet.

Another tool available to hunters for field dressing is a wire saw. Wire saws are compact and light for carrying in the field. However, in use, the end of the wire is difficult to thread under the pelvis bone of a large game carcass to extend out on both ends of the pelvis. A goal is to avoid puncturing the bladder 210 or colon 120. Once threaded, the wire saw ends can be pulled back and forth to cut the pelvis. One drawback of the wire saw is that it kinks with use and becomes unfit for reuse. The wire saw is typically only used for the pelvis bone since the pelvis bone is sufficiently small for the saw to pass completely under it and pulled from the top. The brisket is typically too large for this. The hunter must then carry a knife, wire saw, and another device for splitting the brisket.

Knives with saw blades represent another class of tool used for field dressing. These knives are easy to carry but difficult to use to saw through the pelvis and brisket bones of large game animals. The saw blade included in a knife typically does not have sufficient length to be used horizontally across the pelvis bone. Thus, the saw blade is typically oriented vertically to saw through the pelvis bone from one end to the other, aiming the end of the saw blade toward the spine. Again, the urethra 110 and colon 120 are likely to be punctured and the meat contaminated. Knife saw blades tend to have very pointed teeth that dull rapidly. These teeth are difficult to sharpen. Saw blades included with knives, and particularly those having aggressive saw teeth, are difficult to clean. Bone chips, flesh, and fat lodge in-between the teeth, requiring rubbing and/or brushing for removal. An advantage to the use of a knife saw blade is: only one device needs to be carried while hunting.

Present day hunting knives typically have a blade that is too long for the purpose of splitting the pelvis or brisket bones of large game. When impacting such a knife with a stone or stick, as is sometimes done, a misalignment can easily break the knife blade. Additionally, a single-edged blade cannot be effectively worked back and forth in the bone to elongate a groove. As shown in FIG. 3, such an attempt will only elongate the groove 310 in the direction of the sharp edge of the blade 300.

A skinning and gutting knife was disclosed by Bloch in U.S. Pat. No. 5,033,987. The longitudinal axis of the handle of this knife is not parallel with the longitudinal axis of the blade. The disclosed method for applying a large impact force is to strike the back of the blade (opposite the edge) with a foreign object encountered in the field, such as a rock or piece of wood. Such application has the potential to damage a knife by applying a force that is not parallel to the plane of the blade. Furthermore, there is no guarantee a foreign object such as a rock or piece of wood will be handy to a hunter, especially in conditions of deep snow.

A gutting knife is disclosed in U.S. Pat. No. 6,578,271 by Macek. This knife has two forward extensions with a slot between them. In that slot are saw teeth. A method for severing bone is described as applying the slot to the bone and working the handle up and down to apply the saw teeth to the bone. Because the knife blade extends into the abdominal cavity of the carcass, when applying this knife to the severing of a pelvis bone of a large game animal, the probability of cutting or tearing the urethra 110 or the colon 120 is very high. Bone severed by impact of the knife is not disclosed.

There is, therefore a need for a single tool by which small and large game may be field dressed, including the expedient and safe severing of the pelvis and brisket bones.

BRIEF SUMMARY OF THE INVENTION

An object of the present invention is to provide a single tool by which small and large game may be field dressed, including the severing of the pelvis and brisket bones. An additional object is for a tool that is sufficiently light and compact to be carried by a hunter in the field or woods for extended periods. Further, it is an object of this invention to provide a method for conveniently and efficiently splitting the pelvis and brisket bones of small and large game with the same tool used for other field dressing steps.

To effect the above objects, a novel field dressing knife is disclosed. Various embodiments of the field dressing knife include the following design aspects:
  a large surface area at the butt-end of the knife handle,
  a circumferential groove near the butt-end of the knife handle for engaging the index finger and thumb of the user, further increasing the effective surface area of the butt-end of the handle,
  a double-edged blade, and
  a conversion to a hatchet-like device for chopping.

The field dressing knife handle butt-end will preferably have a surface area between 1.35 and 10 square inches.

In use for splitting the pelvis and brisket bones of large game, the field dressing knife may be held with a gripping hand and the butt-end of the knife handle struck with the user's free hand to penetrate the cartilage and bone. The great surface area of the butt-end of the field dressing knife, and the additional area provided by the user's gripping hand, are needed for impacting the butt-end of the knife handle with a hand with sufficient force to sever bone but not so much as to cause a hand injury.

After gaining some entrance into the pelvis or brisket bone with the field dressing knife blade, the knife may be worked back and forth to extend the groove made by the knife. Therefore, the blade of the knife is preferably sharp on both edges, so it will cut when worked in both directions.

Some hunters have grown accustomed to using a hatchet for splitting the pelvis and brisket bones of their large game. To provide a single tool for both hatchet and knife field dressing operations, the handle of the instant invention may be configured as a knife handle or as a hatchet handle. The handle, when configured for hatchet use, may be angled relative to the blade in a plurality of angles. This feature increases the versatility of the field dressing knife, and permits the user to select the best angle for the instant need.

The field dressing knife of the present invention may include a gut hook and a blade suitable for field dressing operations other than splitting bone and severing cartilage. Hence, a single, compact tool may be carried in the field to perform all operations of field dressing.

Other objects, advantages and novel features of the present invention will become apparent from the following detailed description of the invention when considered in conjunction with the accompanying drawings.

BRIEF DESCRIPTION OF THE SEVERAL VIEWS OF THE DRAWINGS

FIG. 19a is a detail view of an additional embodiment of the field dressing knife having a telescopic handle, the handle being in a short mode;

FIG. 19b is a detail of a latch for the telescopic handle of the additional embodiment;

FIG. 19c is a cross-sectional shape of the field dressing knife of the additional embodiment;

FIG. 20 is a plan view of the additional embodiment of the field dressing knife having a telescopic handle;

FIG. 23a is a perspective view of a first embodiment of a field dressing knife handle attachment;

FIG. 23b is a cutaway view of the first embodiment of the field dressing knife handle attachment;

FIG. 24a is a perspective view of a second embodiment of a field dressing knife handle attachment;

FIG. 24b is a cutaway view of the second embodiment of the field dressing knife handle attachment;

FIG. 27 is a side elevation view of a folding field dressing knife with the blade out for use;

FIG. 28 is a side elevation view of a folding field dressing knife with the blade folded in for storage, transport, and safety;

FIG. 30 is a plan view of the field dressing knife with the handle in its contracted mode;

FIG. 31 is a side elevation view of the field dressing knife with the handle in its contracted mode;

FIG. 32 is a side elevation view of the field dressing knife with the handle in its extended mode;

FIG. 33 is a plan view of the field dressing knife with the handle in its extended mode;

FIG. 34 is a first side elevation view of the field dressing knife with the handle in its extended mode and its blade in its hatchet mode;

FIG. 35 is a first plan view of the field dressing knife with the handle in its extended mode and its blade in its hatchet mode;

FIG. 36 is a second side elevation view of the field dressing knife with the handle in its extended mode and its blade in its hatchet mode;

FIG. 37 is a second plan view of the field dressing knife with the handle in its extended mode and its blade in its hatchet mode;

DETAILED DESCRIPTION OF THE INVENTION

Figure 4:
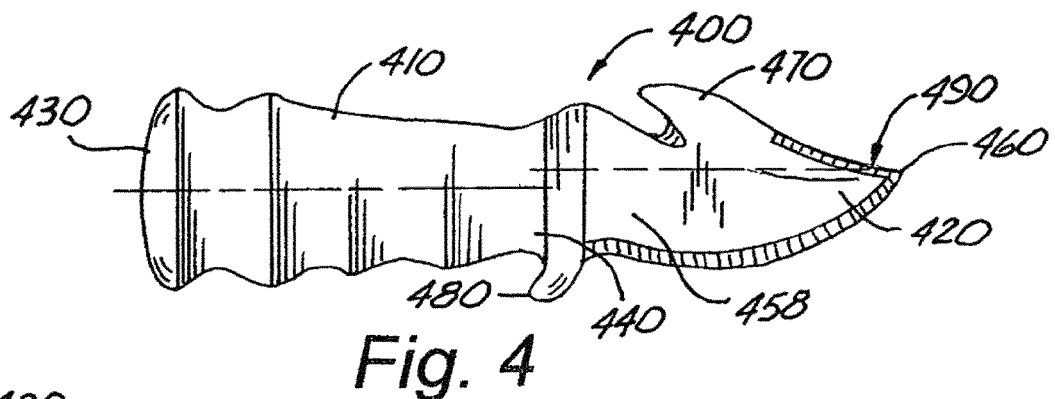
FIG. 4 is a side elevation view of a field dressing knife of the present invention.

A longitudinal axis of a handle 410 of a field dressing knife 400 is defined as passing through the handle 410 from the butt end 430 of the handle 410 to the guard end 440 of the handle 410 as shown in FIG. 4. The longitudinal axis of the blade 420 is also shown passing from the guard end 440 of the blade to the tip 460 of the blade 420. These axes are substantially parallel in FIGS. 4, 7, 8, 13, 14, 16, 17, 19a, 20, 30-33, and 36. The knife blade 420 will preferably include a gut hook 470, a blade guard 480, and a double edge 490.

Figure 5:
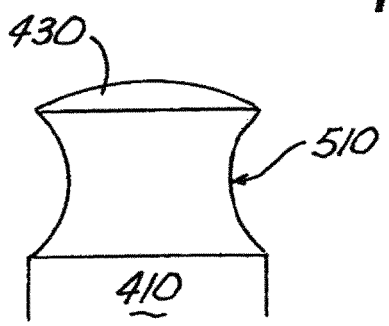
FIG. 5 is a detail of the field dressing knife showing the handle butt-end groove.
Figure 6:
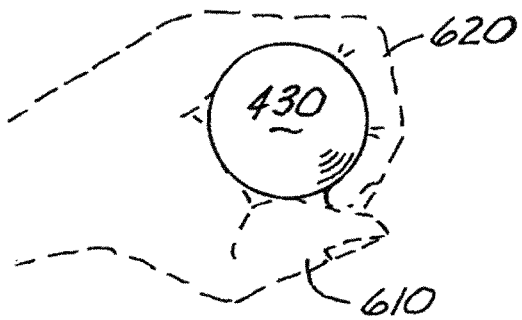
FIG. 6 is a plan view showing the field dressing knife being held ready to be struck with a free hand.
Figure 11:
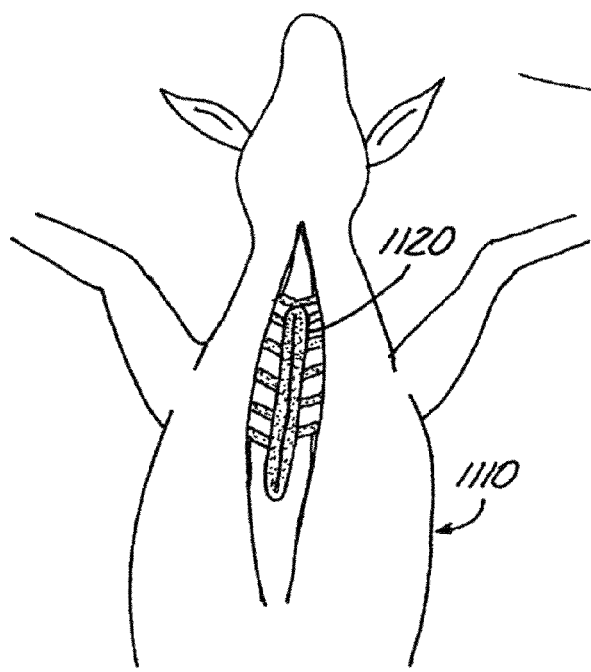
FIG. 11 is a detail of a large animal carcass showing the brisket bone.

In one embodiment, near the butt-end 430 of the handle 410, a groove 510, detailed in FIG. 5, is provided into which to engage a user's thumb 610 and forefinger 620 as shown in FIG. 6 for the purpose of severing a pelvis or brisket bone of a small or large animal carcass 1110 (see FIG. 11). A result of the grip arrangement shown in FIG. 6 is a larger effective surface area on which to strike with a free hand 810 (see FIG. 8) to provide the force to cause the knife blade 420 to enter the bone or cartilage.

Figure 7:
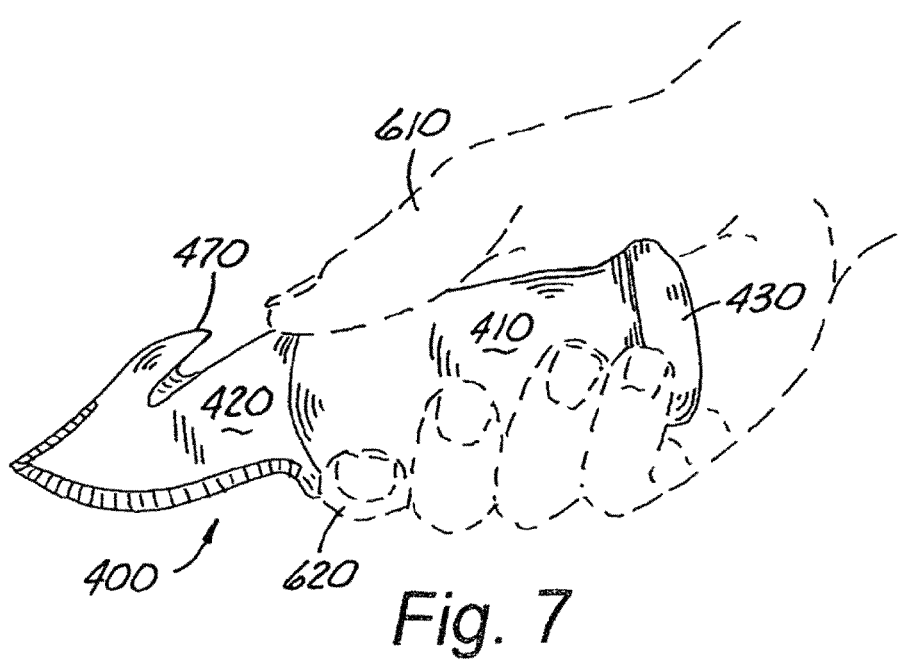
FIG. 7 is a perspective view of the field dressing knife held in a hand for skinning and cutting.

In FIG. 7, a user is shown holding the field dressing knife 400 in a position for cutting, slicing, skinning, etc.

Figure 8:
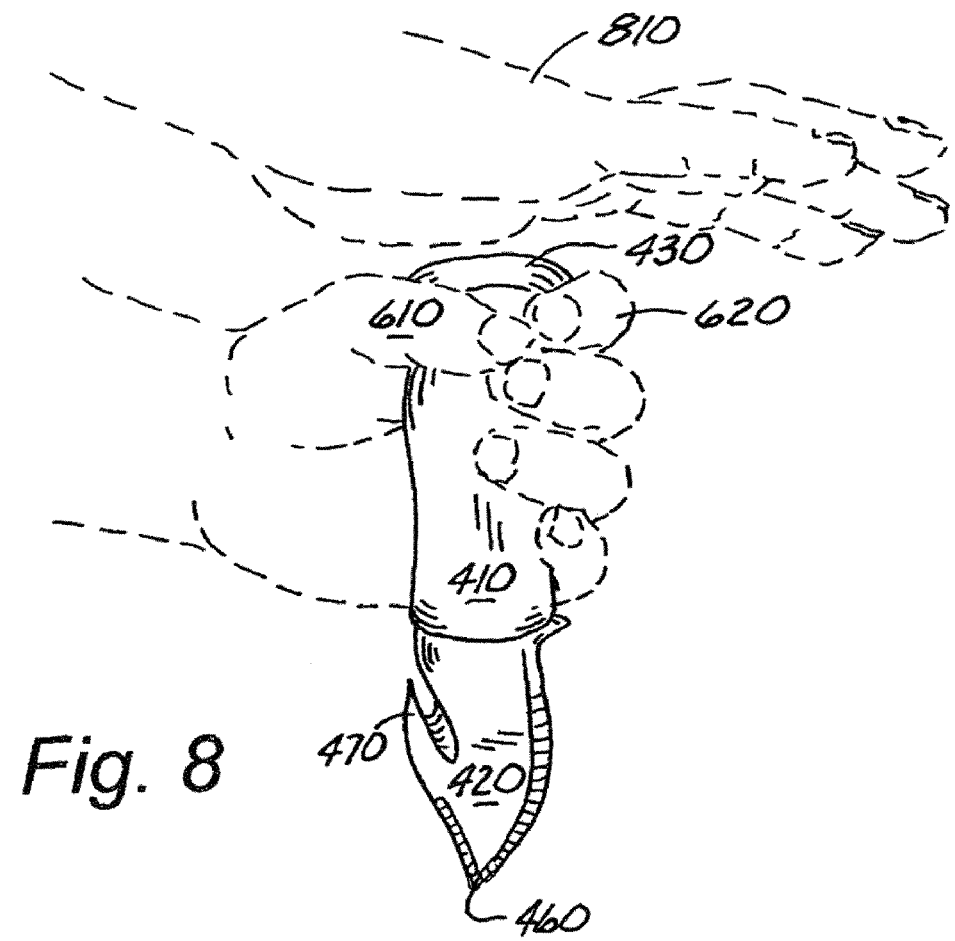
FIG. 8 is a perspective view of the field dressing knife held in position for severing bone by striking with a free hand.
Figure 10:
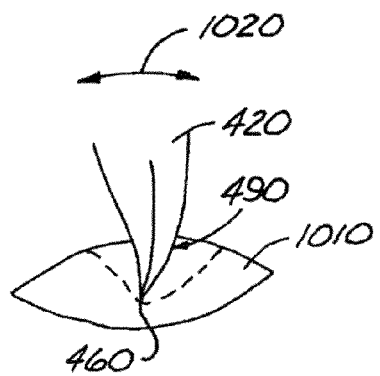
FIG. 10 is a detail view of a double-edged knife being used for splitting bone.

Another use, already mentioned, for the field dressing knife 400 is that of bone severing. To effect this process, the field dressing knife 400 is turned to an approximately vertical orientation with the blade tip 460 downward in contact with the bone or cartilage 1010 as illustrated in FIGS. 8 and 10. The butt end 430 of the field dressing knife handle 410 is then struck with the user's free hand 810 to provide the force needed to cause the knife blade tip 460 to enter the bone or cartilage 1010. Once the knife blade tip 460 has entered the bone or cartilage 1010, the field dressing knife 400 is worked back and forth according to the arrows 1020 in FIG. 10. In this way, the slot caused by the knife blade tip 460 is elongated, furthering the bone or cartilage severing process.

Figure 9:
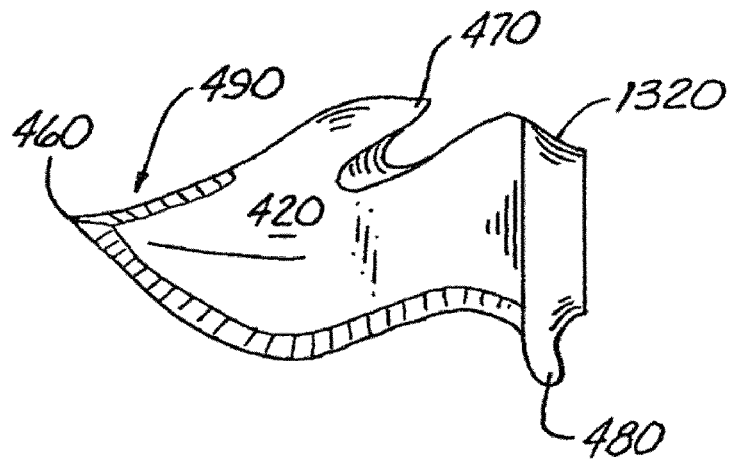
FIG. 9 is a side elevation view of a field dressing knife blade, a thumb-push ridge, and finger guard.

An example of a knife blade 420 without the knife handle 410 is shown in FIG. 9. In this figure, the blade guard 480 and thumb-push 1320 are shown integral with the knife blade 420. The present invention is not limited to a guard 480 or a thumb-push 1320 integral with the blade 420. Note that the blade guard 480 and the thumb-push 1320 may be made integral with the handle 410 instead of the blade 420 as shown in FIGS. 36 and 37.

Figure 1:
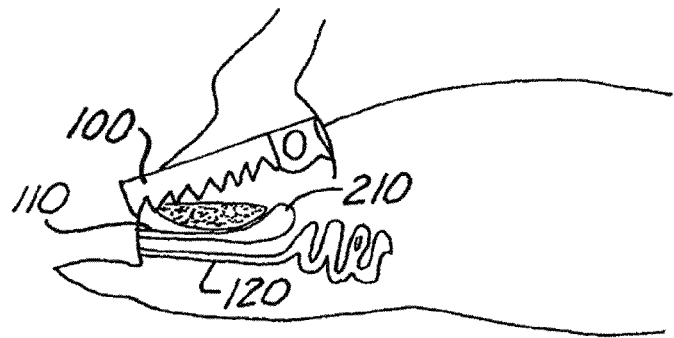
FIG. 1 is a detail view showing a handsaw being used in a vertical orientation for splitting the pelvis bone of a large game carcass.
Figure 2:
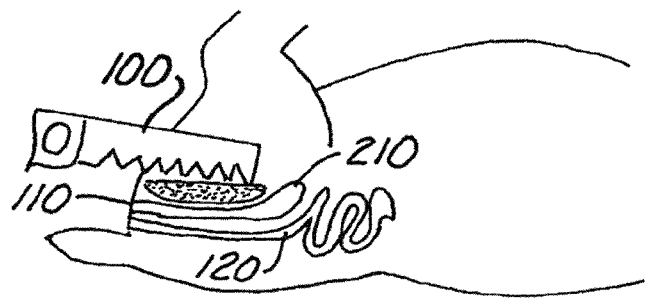
FIG. 2 is a detail view showing a handsaw being used in a horizontal orientation for splitting the pelvis bone of a large game carcass.
Figure 3:
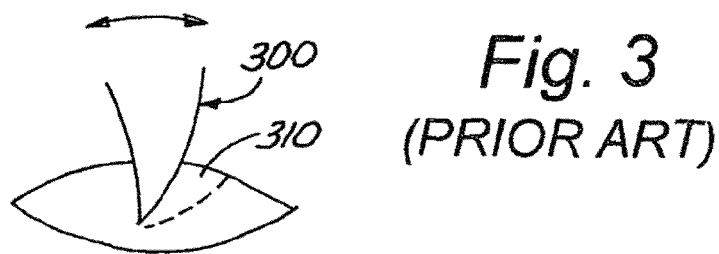
FIG. 3 is a detail view of a single-edged knife being used for splitting bone.
Figure 12:
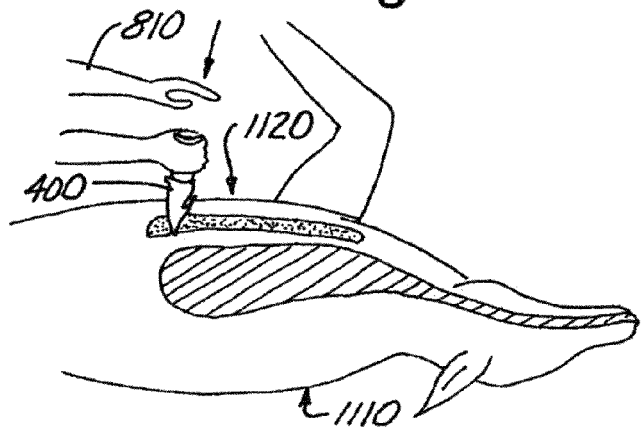
FIG. 12 is a perspective view of the field dressing knife being used to split the brisket bone of a large animal carcass.

A large animal carcass 1110 is shown in FIGS. 11 and 12. Preferably, during field dressing, the brisket bone 1120 and the pelvis bone (see FIGS. 1 and 2) should be severed to assist in removing viscera and enhance blood drainage and cooling of the carcass. In FIG. 12, the process of severing the brisket bone 1120 is illustrated. The field dressing knife 400 is also shown in operation.

A preferred method of splitting the brisket bone 1120 is to drive the field dressing knife 400 off center of the brisket bone 1120 approximately one fourth to one and a half inches. Here, the ribs are softer and connected to the brisket bone 1120 with cartilage, making severing easier. A preferred method of splitting the pelvis bone comprises orienting the knife blade 420 parallel to a center ridge of the carcass pelvis bone and driving the field dressing knife blade tip 460 into the center ridge with the user's free hand.

Figure 13:
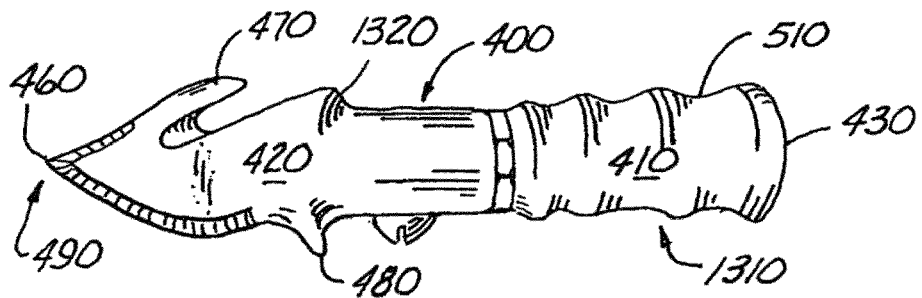
FIG. 13 is a side elevation view of a field dressing knife with a handle contracted.
Figure 14:
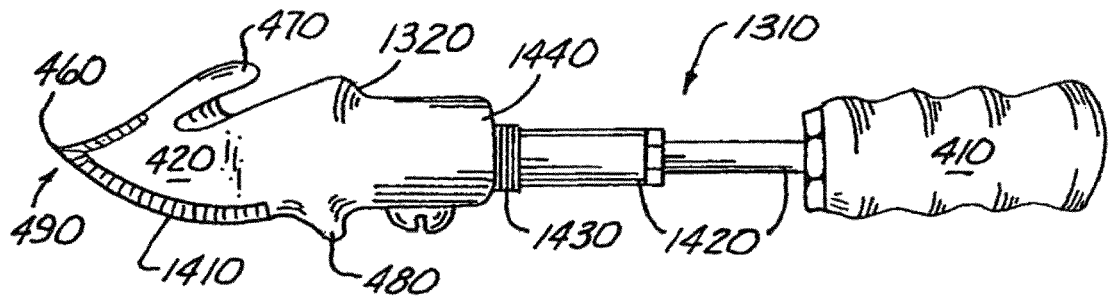
FIG. 14 is a side elevation view of a field dressing knife with a handle extended, longitudinal axes of the handle and a blade being parallel.
Figure 15:
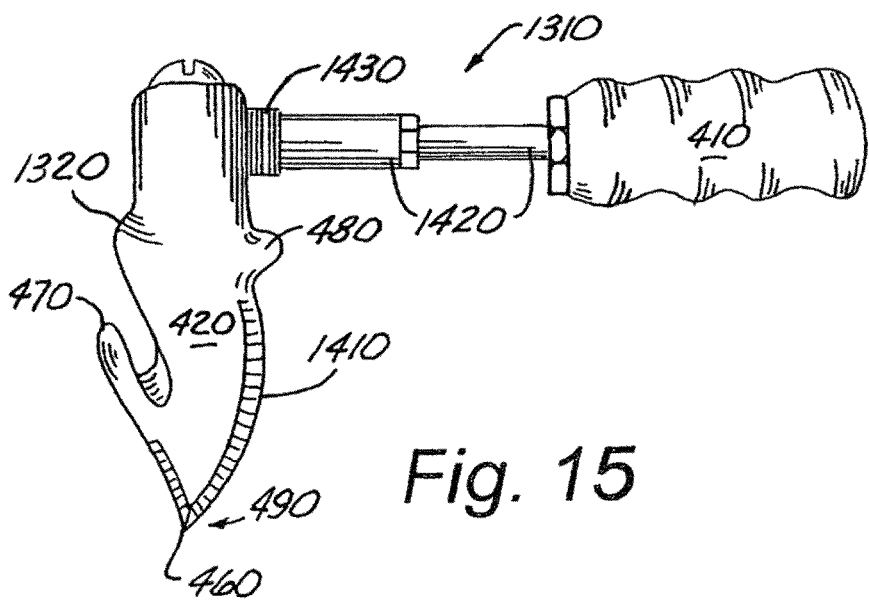
FIG. 15 is a side elevation view of a field dressing knife with a handle extended, longitudinal axes of the handle and a blade being approximately perpendicular.

A novel handle assembly 1310 for the field dressing knife is shown in FIGS. 13-18. The handle assembly 1310 may be used in a contracted position as shown in FIG. 13, or extended as shown in FIGS. 14 and 15. In the extended position, the field dressing knife 400 may be used as a hatchet in which a blade edge 1410 or a tip 460 may be used to strike a bone 1010 for the purpose of severing bone or cartilage 1010.

Another aspect of the embodiment of the field dressing knife 400 shown in FIGS. 13-15, 25, 26, 29a, 31, 32, 34, 36, and 37 is a thumb-push ridge 1320. The location and configuration of this thumb-push ridge 1320 is such that a user's thumb rests against the thumb-push ridge 1320 during some modes of usage, and provides stability, control, and comfort.

In the embodiment shown in FIGS. 13-18, the handle assembly 1310 may engage the blade 420 in either of two positions. In the position shown in FIGS. 13-14 and 16-17, the longitudinal axis of the handle 410 is substantially parallel to the longitudinal axis of the blade 420. In this configuration, the field dressing knife 400 may be used to split bone or cartilage, slice, cut, and skin. In the configuration of FIG. 14, the field dressing knife 400 may also be used to chop bone 1010 wherein the edge 1410 is used to strike the bone 1010 and sever bone when gripped as seen in FIGS. 7 and 14.

When the field dressing knife 400 is configured as shown in FIGS. 15, 18, 34, 35, and 37, it is typically used as a hatchet wherein the knife blade tip 460 strikes the bone or cartilage 1010. In this configuration, the longitudinal axes of the knife blade 420 and the handle 410 are not substantially parallel, but rather, substantially perpendicular.

Preferably, the handle assembly 1310 will extend, giving an overall length of about nine inches for use as a hatchet. The handle assembly 1310 of the present embodiment comprises three sections: the handle 410 and two inner sections 1420 that fit inside the handle 410 section. The inner sections 1420 includes threads 1430 for engaging a knife blade block 1440, being defined for the purposes of this document as the portion between the blade guard 480 and the handle, and is integral with the knife blade 420. The knife blade block 1440 includes two apertures with female threads into which the threads 1430 of the inner sections 1420 are alternately engaged.

Figure 17:
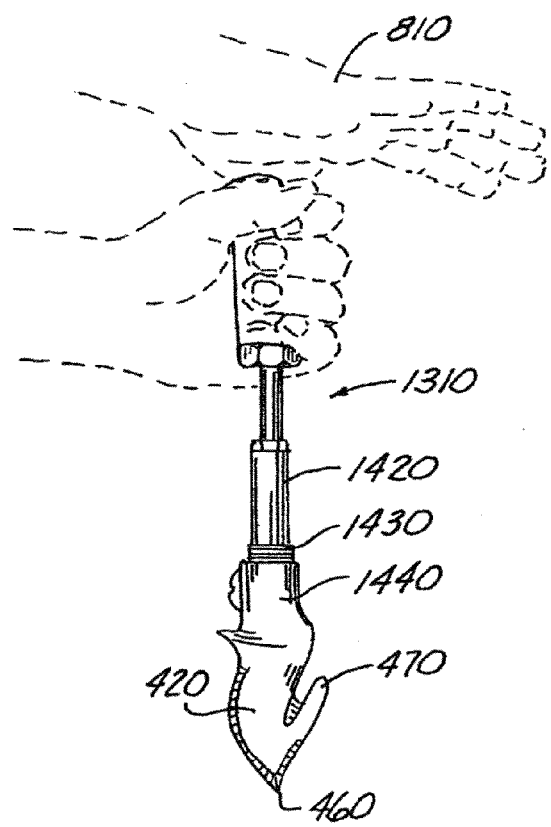
FIG. 17 is a perspective view of a field dressing knife with the handle extended and held for severing bone.
Figure 16:
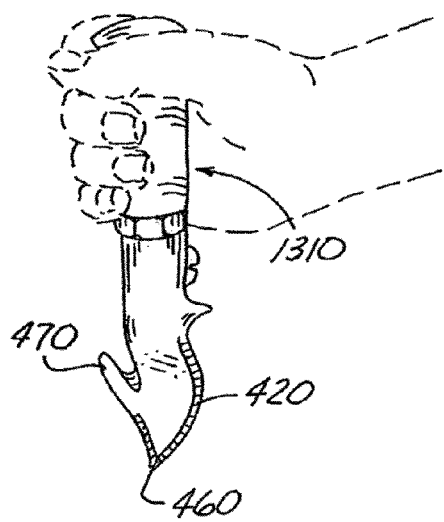
FIG. 16 is a perspective view of a field dressing knife with the handle contracted and held for severing bone.
Figure 18:
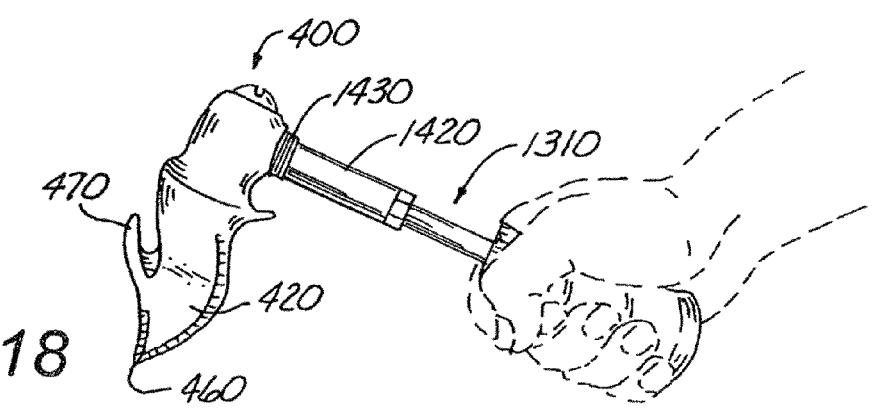
FIG. 18 is a perspective view of a field dressing knife with the handle extended and the handle rotated to be used as a hatchet.

FIGS. 16-18 show the field dressing knife 400 in various modes of use. The versatility of the field dressing knife 400 is evident in these figures. Extending the handle assembly 1310 for striking the butt end 430 of the handle 410 with the user's free hand 810 may provide a better working position or angle for accomplishing the requisite bone or cartilage severing process.

An additional embodiment of the field dressing knife 400 is shown in FIGS. 19a-21. In this embodiment, the included angle, θ2110, between the longitudinal axis of the blade 420 and the longitudinal axis of the handle 410 is varied by mating two halves of a star gear 1910 in various configurations. The included angle, θ2110, may take on values from approximately 45 degrees to 315 degrees.

Figure 22:
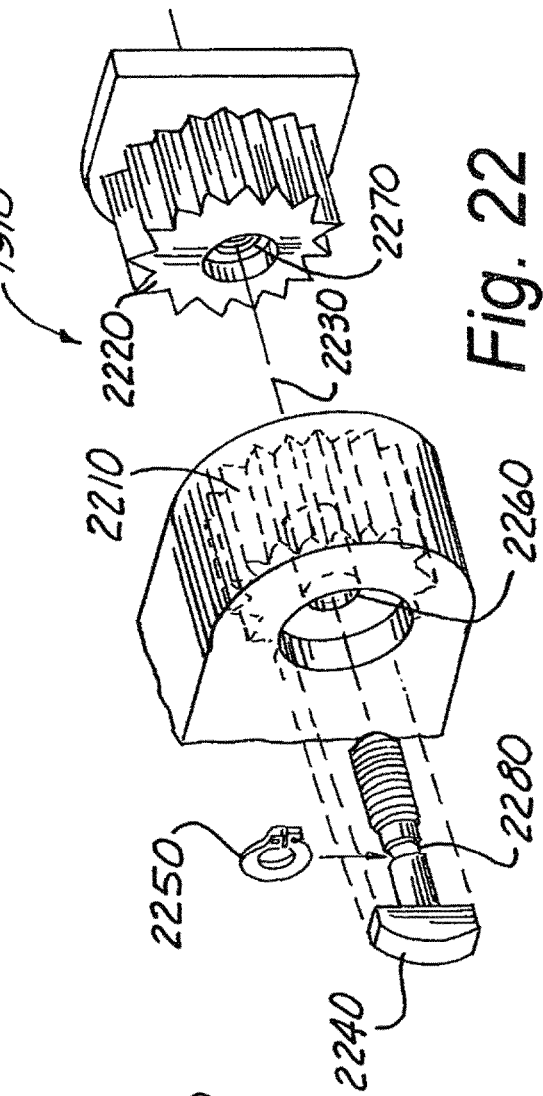
FIG. 22 is an exploded view of a star gear assembly.

A star gear 1910 is defined herein as a construct as detailed in FIG. 22 having two symmetrical, mating halves 2210, 2220. Because of their symmetry, said mating halves 2210, 2220 may be engaged one to another in a plurality of configurations all having a common axis. In order to change the mating configuration, the two halves 2210, 2220 are rotated relative to one another on the common axis of rotation 2230. The shape needs only be symmetric, a multi-pointed star shape is not necessary to this definition. The above definition is used herein, including in the claims.

The two symmetric, mating halves 2210, 2220 of the star gear 1910 are held together with a special, T-headed bolt 2240 while the field dressing knife 400 is in use. In the preferred embodiment, the T-headed bolt 2240 is held engaged in the female half 2210 of the star gear 1910 by engaging a snap ring 2250 to a groove 2280 in the T-headed bolt 2240 after inserting the T-headed bolt 2240 through an aperture 2260 in the female half 2210 of the star gear 1910. Said snap ring 2250 has an outer diameter or dimension greater than that of the aperture 2260.

The threaded end of the T-headed bolt 2240 is threaded into female threads in an aperture 2270 of the male half 2220 of the star gear 1910. Unthreading the T-headed bolt 2240 draws the female half 2210 of the star gear 1910 away from the male half 2220 because the snap ring 2250 engages an inside surface of the female half 2210 around the aperture 2260. When the T-headed bolt 2240 is tightened down, the mating halves 2210, 2220 of the star gear 1910 are held firmly together so that the field dressing knife 400 may be used for slicing, chopping, piercing, etc. without fear that the included angle, θ2110, of the longitudinal axis of the blade 420 to that of the handle 410 will change under force.

Details of the handle 410 assembly are also shown in FIGS. 19a-21. The handle of this embodiment comprises two sections 1920, 1930. At least one inner section 1930 fits slidably inside the outer section 1920 so that the two sections 1920, 1930 may telescope to produce a longer and a shorter handle 410. The cross sectional shape of the sections 1920, 1930 is preferably non-circular such as the oval or ellipse shown in FIG. 19c. Other non-circular shapes are viable such as polygons. Because of the non-circular cross section, the sections 1920, 1930 do not rotate relative to one another.

Figure 21:
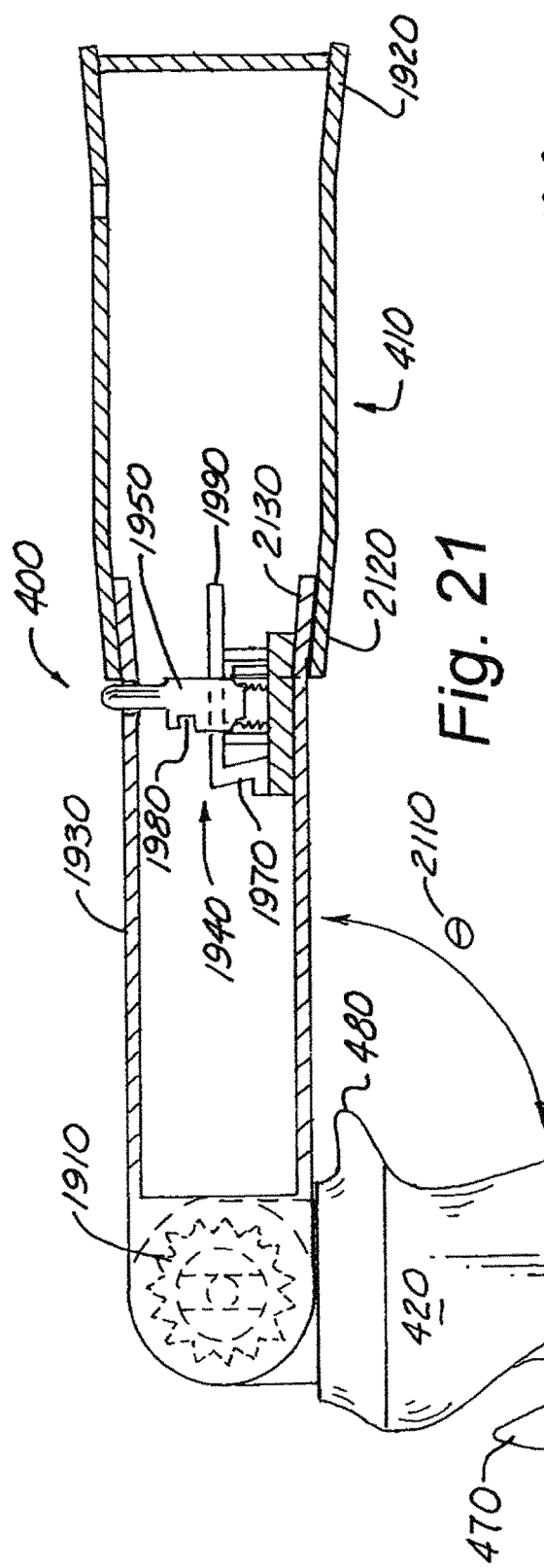
FIG. 21 is a detail view of an additional embodiment of the field dressing knife having a telescopic handle, the handle being in a long mode.

The two sections 1920, 1930 are held in the shorter arrangement shown in FIGS. 19a and 20, and secured in the longer arrangement shown in FIG. 21 by a spring lock assembly 1940. The spring lock assembly 1940 comprises a button 1950 (see also FIG. 19b) which engages an aperture in the inner handle section 1930 and engages the outer handle section 1920 in two ways to cause the two sections 1920, 1930 to maintain a given configuration with respect to one another. When the handle 410 is in its short mode, the button 1950 engages an aperture toward the butt-end of the outer section 1920. When the handle 410 is in its long mode, the button 1950 engages an edge of the outer section 1920 nearest the blade as shown in FIG. 21. In the long mode, the handle sections 1920, 1930 are held strongly in their respective positions by the matching tapered regions 2120, 2130 engaged to one another. The button 1950, in this case, represents added security.

The button 1950 is forced outward by a spring 1960. The spring 1960 may be a coil spring or an elastic material such as rubber.

A Z-clip 1970 is made to engage a notch 1980 in the button 1950 when the button 1950 is sufficiently depressed. The thickness of the outer section 1920 wall is sufficiently great in the vicinity of the butt-end aperture to disallow the button 1950 from being adequately depressed to engage the Z-clip 1970. In use, the button 1950 is depressed when the field dressing knife handle 410 is in its short mode as shown in FIGS. 19a and 20 in order to extend the handle 410 to its long mode as shown in FIG. 21. In this instance, the Z-clip 1970 does not engage in the button notch 1980, but as the outer handle section 1920 is pulled away from the blade 420, the button 1950 slips under the outer section 1920 housing and is thereby disallowed from being forced further outward by the spring 1960. The outer section 1920 of the handle 410 is slid further away from the knife blade 420 until the button 1950 is able to slide through the aperture in the inner section 1930 past the edge of the outer section 1920 closest to the blade 420. At this point, the spring 1960 forces the button 1950 outward to secure the two handle sections 1920, 1930 stationary with respect to one another.

To return the handle 410 to its short mode, the button 1950 is again depressed by the operator, this time until the Z-clip engages the notch 1980 in the button 1950. The button 1950 is thereby held in its depressed state while the user uses both hands to return the outer section 1920 of the handle 410 back toward the field dressing knife blade 420 to the short mode. A finger 1990 engages the butt-end of the outer section 1920 when the outer section 1920 has been adequately forced toward the blade 420. The finger 1990 in turn engages an appendage 1995 (FIG. 19b) of the Z-clip 1970, forcing the Z-clip 1970 to disengage from the button notch 1980 and permitting the button 1950 to engage into the aperture of the outer section 1920 nearest the butt-end of the handle 410.

The mating tapered regions 2120, 2130 in the handle sections 1920, 1930 are machined or formed accurately to provide firm, rigid engagement of the two sections 1920, 1930 when the handle 410 is in the long mode. The handle 410 is transformed from the short mode to the long mode by depressing the button 1950 while holding the outer section 1920 in a vertical position with the blade 420 downward. When the button is depressed, the handle 410 is raised as the handle 410 extends due to gravity and snaps into place. Due to a small amount of elasticity and the friction between the two handle sections 1920, 1930, the two handle sections 1920, 1930 wedge tightly and rigidly. At this point, the button 1950 returns to its outward position under the force of the spring 1960, to help secure the two handle sections 1920, 1930 in their positions relative to one another.

Due to the firm engagement of the two handle sections 1920, 1930, a relatively large, sharp force must be applied to return the handle 410 to its short mode. Therefore, the button 1950 is made to lock down with the engagement of the Z-clip 1970 in the button notch 1980 when the button 1950 is sufficiently depressed. When the button 1950 is in its locked-down position, the user is free to use both hands to apply the large force required to free the tapered regions 2120, 2130 in the two handle sections 1920, 1930 from one another. To apply an adequate force, the blade 420 of the field dressing knife 400 is placed in a sheath or scabbard (not shown). The sheath is firmly gripped and the knife 400 swung by the user's arm with the handle butt-end 430 downward to strike a safe object such as the ground. With the button 1950 depressed, the outer section 1920 is free to return over the inner section 1930. In this process, it is very helpful that the button 1950 not require continual depressing.

An optional aspect of the present invention is shown in FIGS. 19a and 21. Gage lines 2140 are shown to provide guidance to the user regarding the depth in which the blade 420 has been driven into bone or cartilage in the process of splitting the pelvic bone or the brisket bone of a small or large animal carcass. The gage lines 2140 may be forged, machined, or etched into the blade 420. Any other suitable approach, providing permanent, robust gage lines 2140 may be used. The present invention is not limited to a specific process of providing these gage lines 2140.

An additional advantage of the present embodiment over the prior art, as shown in FIG. 4, is the tapering or monotonic increase of the cross sectional area of the field dressing knife handle 410 from the blade 420 to the butt-end. This construction greatly enhances a user's ability to grip the knife 400 when the knife 400 is in use.

Three additional embodiments of the field dressing knife 400 are shown in FIGS. 23a, 23b, 24a, and 24b. In these embodiments, an existing knife may be enhanced by the addition of a broadened end cap 2310, 2410. In the first embodiment shown in FIGS. 23a and 23b, an insert 2320 of the broadened end cap 2310 is inserted into a socket in the end of the knife. The broadened end cap has a butt-end 430 having a large surface area, and a groove 510 for receiving a user's index finger and thumb, both as discussed for the other embodiments of the field dressing knife 400.

In the second embodiment, also shown in FIGS. 23a and 23b, the broadened end cap 2310 is made of an elastic material and the narrow section 2320 is stretched over the butt end of the handle of an existing knife. The broadened end cap 2310 is held tightly by the elasticity.

The third embodiment of the broadened end cap 2410 is shown in FIGS. 24a and 24b. In this embodiment, the broadened end cap 2410 slides over the existing handle of the knife, and is held tight by snugly wrapping a strap 2420 about a base of the broadened end cap 2410. The strap is fitted with hook and loop fasteners. A slot 2430 provides sufficient flexure so the broadened end cap 2410 may be tightened down over the knife handle. The broadened end cap 2410 has a mushroom shape, providing a gripping place 2440 for the user's index finger and thumb as before.

Another valid securing method for the broadened end cap 2310 is threading. Male threads provided on the insert 2320 with corresponding female threads in the handle, or female threads on the first embodiment broadened end cap 2410 with corresponding male threads on the knife handle would be provided. The use of the broadened end caps 2310, 2410 would provide to an existing knife some of the advantages described herein for the field dressing knife 400.

Figure 25:
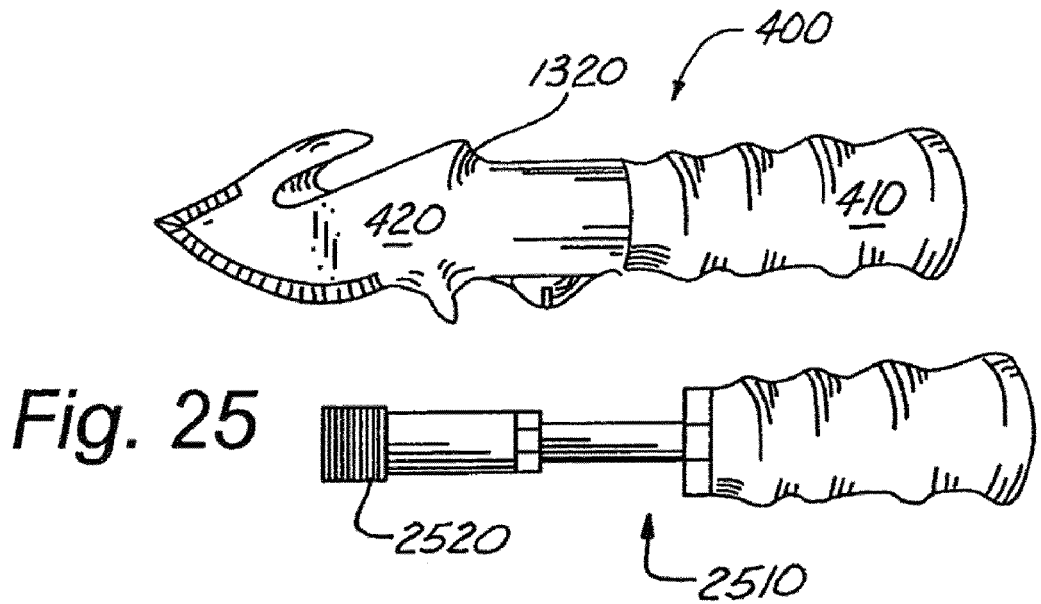
FIG. 25 is a side elevation view of the field dressing knife and separate handle for converting the field dressing knife to a hatchet.
Figure 26:
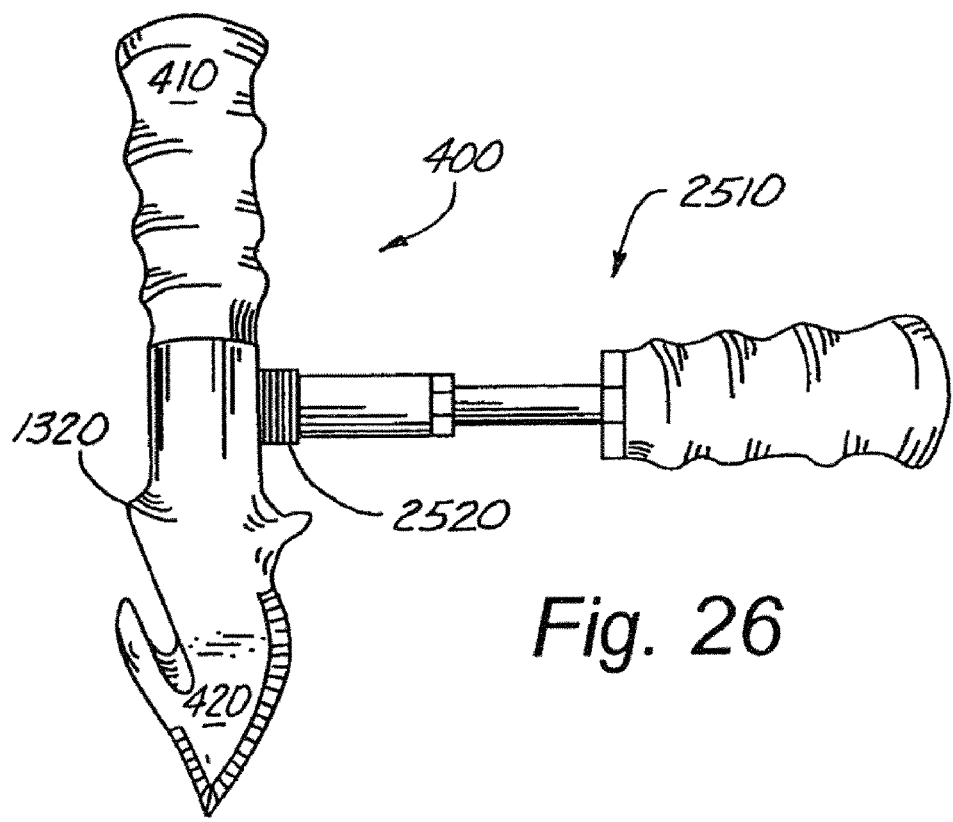
FIG. 26 is a side elevation view of the field dressing knife and separate handle configured for use as a hatchet.

It should be noted a separate hatchet handle 2510 for configuring the field dressing knife 400 may be used as clearly shown in FIGS. 25 and 26. In this case, the hatchet handle 2510 is carried by the hunter, in addition to the field dressing knife 400. The hatchet handle 2510 may be extensible, or of fixed length and may be attached at included angles less than or greater than 90 degrees. The field dressing knife 400 and hatchet handle 2510 may attach in a variety of ways, including the threads 2520, shown, wedging, pinning, clipping, etc. The present invention is not limited to a particular attachment method.

An additional embodiment of the field dressing knife 400 is illustrated in FIGS. 27 and 28. In this embodiment, the blade 420 of the field dressing knife 400 is foldable into the handle 410 for safety, transport, convenience, portability, etc. A spring clip 2710 provides the security to hold the knife blade 420 in place, both in use and in the folded position as shown in FIG. 28. To release the blade 420, the spring clip 2710 is pressed with a user's digit at a depression 2720 in the handle against the force of a spring 2730. The spring clip 2710 rotates about a pivot 2740 which lifts the blade-end of the spring clip 2710 to release the blade 420.

The handle of the folding field dressing knife 400 has the same broadened butt-end 430 and groove 510 as discussed above.

Figure 29B:
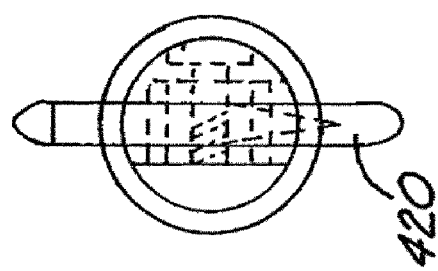
FIG. 29b is an end view of the field dressing knife blade with the star gear.
Figure 29A:
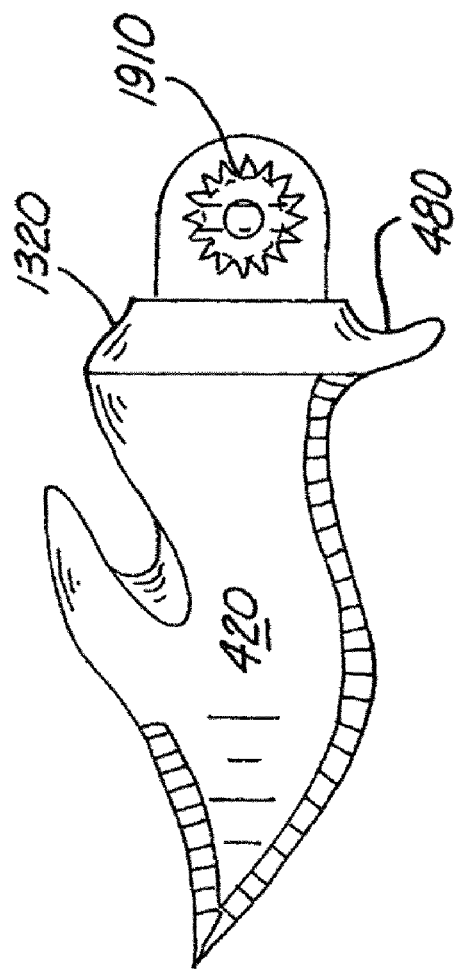
FIG. 29a is a side elevation view of the field dressing knife blade with the star gear.
Figure 29C:
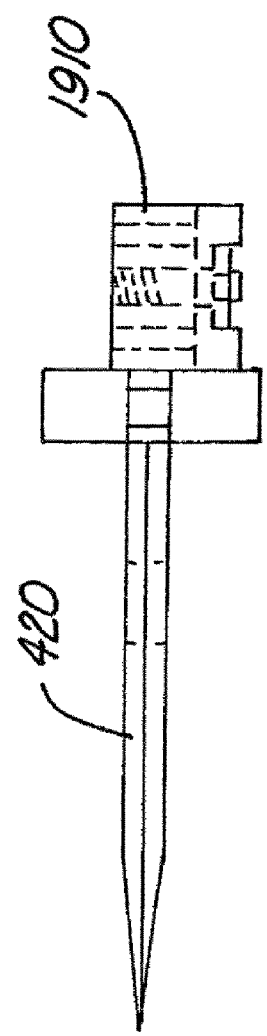
FIG. 29c is a plan view of the field dressing knife blade with the star gear.
Figure 38:
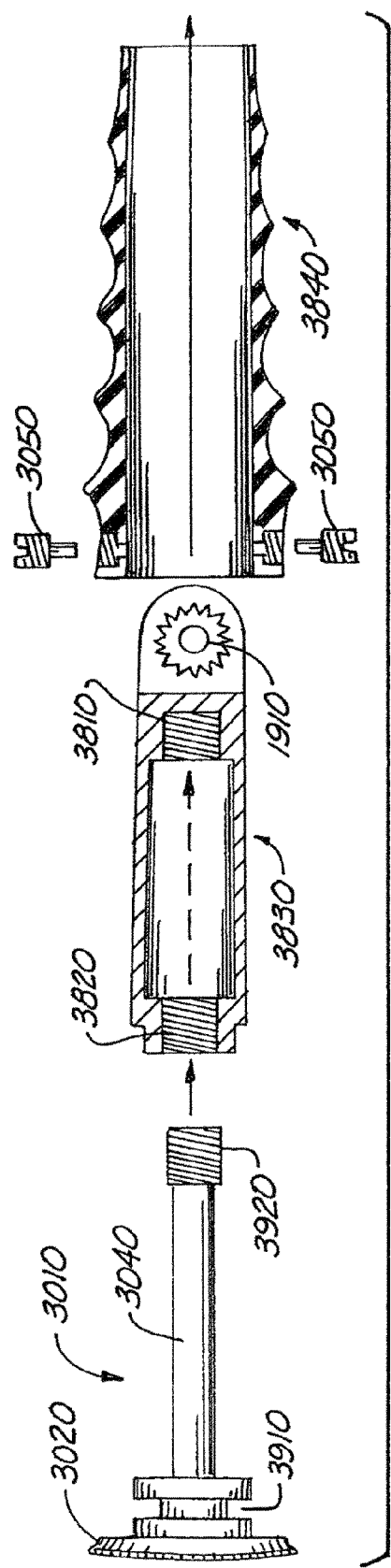
FIG. 38 is an exploded view of one embodiment of the extensible field dressing knife handle.

FIGS. 29a-c show the field dressing knife blade 420 with the star gear 1910, both separated from the remainder of the field dressing knife.

Figure 39:
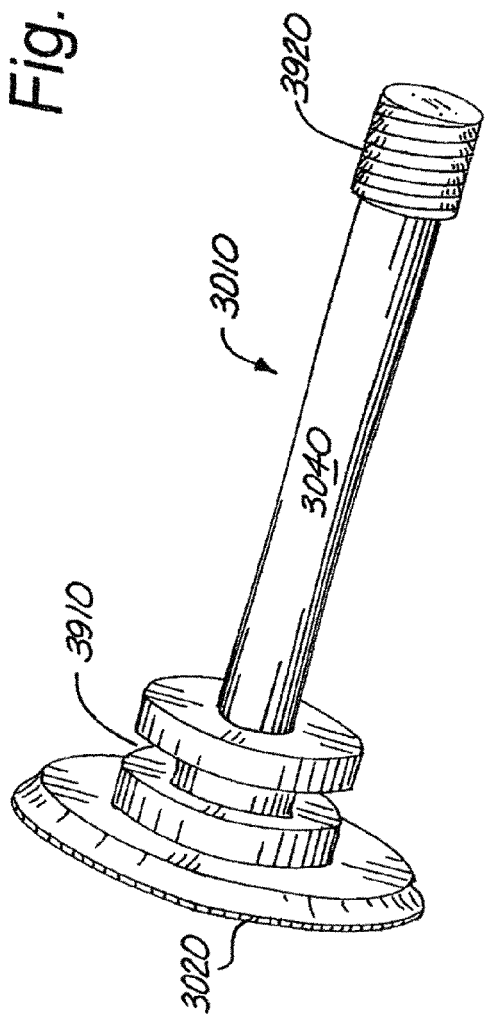
FIG. 39 is a perspective view of a broad-headed bolt.

Still another embodiment of the extending field dressing knife is shown in FIGS. 30-38. A bolt 3010 with a broad head 3020 and a special circumferential groove 3910 on the shank 3040 side of the broad head 3020 is shown in FIG. 39. The diameter of the shank 3040 of the bolt 3010 is no larger than the minor diameter of the threaded region 3920 for a reason that will become apparent following.

The bolt 3010 is inserted into the handle 410 as shown in FIGS. 30-32 so the broad head 3020 of the bolt 3010 makes up the butt-end 430 of the handle 410. The male threaded region 3920 of the bolt 3010 engages either of two female threaded regions 3810, 3820 within the inner section 3030 of the handle depending on whether the handle is in its extended mode (FIGS. 32-37) or its contracted mode (FIGS. 30-31). The bolt 3010 is retained in the field dressing knife handle 410 by, preferably, three or four retaining screws 3050 engaging the special circumferential groove 3910 but generally fitting loosely in the groove 3910 so the bolt 3010 is free to turn. The retaining screws 3050 are preferably threaded into the outer section 3840 of the field dressing knife handle 410.

When the handle 410 is in its contracted position, as shown in FIGS. 30-31, the male threads 3920 of the bolt 3010 are engaged in the female threads 3810 of the inner handle section 3830 closest to the knife blade 420. The groove 3910 of the broad bolt head 3020 firmly engages the retaining screws 3050 to hold the two knife handle sections 3830, 3840 together.

To extend the field dressing knife handle 410, the broad-headed bolt 3010 is turned by its broad head 3020 by the user to disengage the bolt threads 3920 from the handle threads 3810 closest to the knife blade 420. The outer section 3840 of the knife handle 410 is pulled in a direction away from the knife blade 420 until the bolt threads 3920 can engage the handle threads 3820 nearest the butt-end of the knife handle 410. Therefore, the shank 3040 of the broad-headed bolt 3010 must be able to slide through the handle threads 3820 nearest the butt-end of the knife handle 410. Thus, the shank 3040 must have a diameter no greater than the minor diameter of its threads. The bolt 3010 is turned again in the same direction as before to fully engage the handle threads 3820 nearest the butt-end of the knife handle 410 as shown in FIGS. 32-37. Again, with the retaining screws 3050 engaged in the groove 3910 of the broad bolt head 3020 and the bolt threads 3920 from the handle threads 3820 nearest the butt-end of the knife handle 410, the two knife handle sections 3830, 3840 are rigidly positioned relative to one another.

The cross-sectional shape of the two knife handle sections 3830, 3840 is preferably round, however, the present invention is not limited thereto.

Comparing FIGS. 32 and 36, it can be seen that the thumb-push 1320 and finger guard 3510 may be part of the knife blade 420 or the knife handle 410.

In all of FIGS. 30-38, the cross section of the field dressing knife handle 410 is preferably circular.

Figure 40:
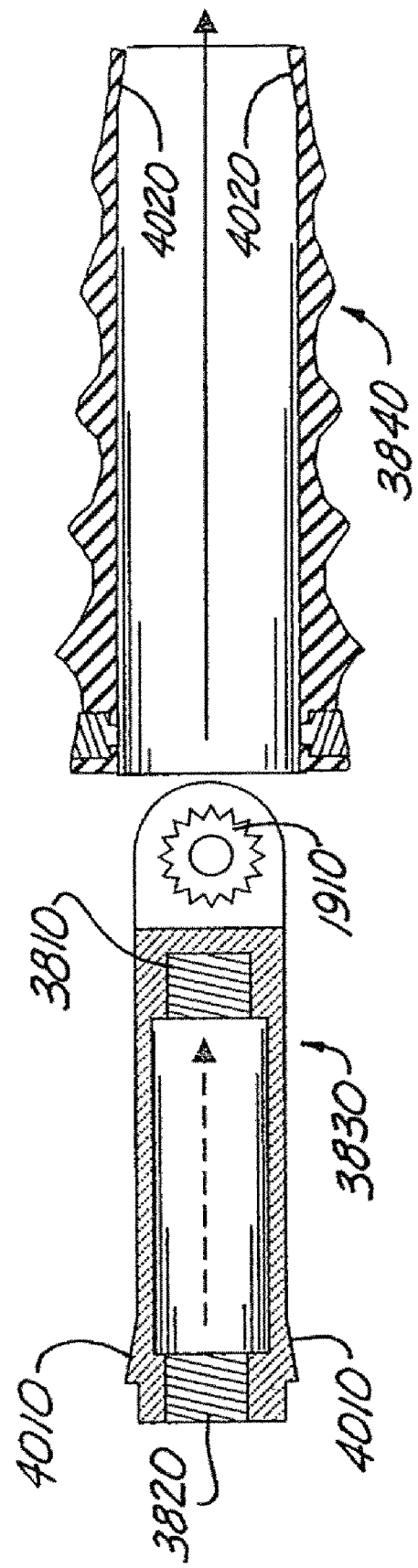
FIG. 40 is an exploded view of an expandable field dressing knife handle.

A structure for securing the two sections 3830, 3840 is clarified in FIG. 40. Again, tapers 4010, 4020 are mated and the slight elasticity and friction between the inner handle section 3830 and the outer handle section 3840 provides a very rigid coupling of the two sections 3830, 3840. The broad-headed bolt 3010 is used to both disengage the tapers 4010, 4020 and also engage the tapers 4010, 4020 by the force the bolt applies via its threads 3920.

The above embodiments are the preferred embodiments, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

In the following claims, the word "bone" is herein defined as either bone or cartilage.

I claim:

1. A field dressing knife comprising:
    a handle-having a longitudinal axis extending through a front end and a butt end;
    a blade operatively attached to the handle, the blade having a tip, the blade having a first thickness for strength and tapering to a second thickness at one edge to be as thin as reasonably possible for cutting, said tip having at least one thickness that is closer to the second thickness than to the first thickness of the blade, the blade having a longitudinal axis extending through the rear end thereof and through the tip, the blade alternatively having a first fixed position wherein the longitudinal axis of the blade and the longitudinal axis of the handle are substantially parallel or identical and a second fixed position with respect to each other wherein the longitudinal axis of the blade is transverse to the longitudinal axis of the handle; and
    the handle having a short position and a long position in at least the first fixed position thereof, the blade being closer to the butt-end of the handle in the short position than in the long position thereof.

2. The field dressing knife of claim 1 wherein, in the long position of the handle of the knife, an overall length of the knife is at least five inches to configure the field dressing knife for use as a hatchet.

3. The field dressing knife of claim 1 additionally comprising a gut hook formed in the blade.

4. The field dressing knife of claim 3 wherein the gut hook is formed in a portion of the blade closer to the handle than to the tip of the blade.

5. The field dressing knife of claim 1 wherein a butt-end of the handle comprises an enlarged surface area between 1.35 and 10 square inches to diffuse a force of a striking hand to the butt-end of the handle.

6. The field dressing knife of claim 1 additionally comprising a circumferential groove disposed near a butt-end of the knife handle such that the portion of the groove furthest from the butt-end forms a ledge for a finger and a thumb to securely rest on as the top of the thumb and finger is at or above the surface of the butt-end: and increasing a surface area struck by the free hand by engaging the finger and the thumb into the circumferential groove.

7. The field dressing knife of claim 1 wherein the handle comprises:
    an outer section;
    a first tapered portion on the outer section;
    an inner section fitting inside the outer section; and
    a second tapered portion on the inner section of the handle, an outer surface of the second tapered portion mating snugly with an inner surface of the first tapered portion of the outer section.

8. The field dressing knife of claim 7 additionally comprising one or more additional inner sections, each of said additional inner section fitting inside the outer section and each of said additional inner section comprising an additional tapered portion.

9. The field dressing knife of claim 1 wherein the there is a system for affixing the blade to the handle at a desired angle, said system comprising:
    a first half of a star gear operatively rigidly affixed to the knife blade and comprising an aperture coaxial with an axis of rotation of the first half of the star gear; and
    a second half of the star gear, made to mate with the first half of the star gear in a plurality of orientations and operatively affixed to the knife handle, said second half of the star gear comprising an aperture coaxial with an axis of rotation of the second half of the star gear, the axis of rotation of the first and second halves of the star gear being collinear.

10. The field dressing knife of claim 9 additionally comprising a bolt providing a force to maintain the first and second halves of the star gears in a mated position in any of the plurality of orientations, said bolt passing through the apertures in the first and second halves of the star gears.

11. The field dressing knife of claim 10 additionally comprising:
    a circumferential groove in the bolt; and
    a snap ring, engaged in the circumferential groove after the bolt has passed through the first half of the star gear, said snap ring positioned to keep the bolt from being removed from the first half of the star gear when the snap ring is engaged in the circumferential groove.

12. The field dressing knife of claim 1 further comprising a system for selectively affixing the blade to the handle at a desired angle.

13. The field dressing knife of claim 1 further wherein the desired angle is ninety degrees.

14. The field dressing knife of claim 1 wherein the blade has at least a third fixed position between the first and second fixed positions.

* * * * *